Jan. 14, 1964  S. HELD  3,118,076
MAGNETO-ELECTRIC SYSTEM TO MAINTAIN THE OSCILLATIONS
OF A BALANCE WHEEL IN A CLOCK-WORK
Filed March 5, 1958  2 Sheets-Sheet 1

Jan. 14, 1964 S. HELD 3,118,076
MAGNETO-ELECTRIC SYSTEM TO MAINTAIN THE OSCILLATIONS
OF A BALANCE WHEEL IN A CLOCK-WORK
Filed March 5, 1958 2 Sheets-Sheet 2
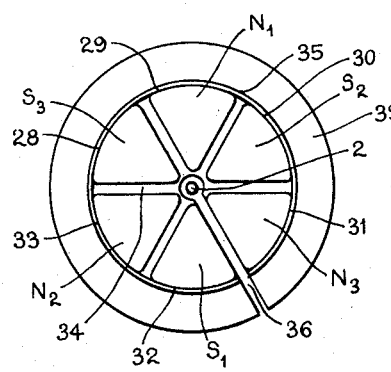
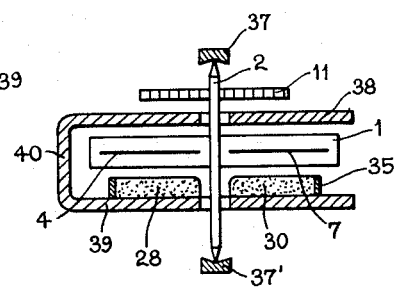
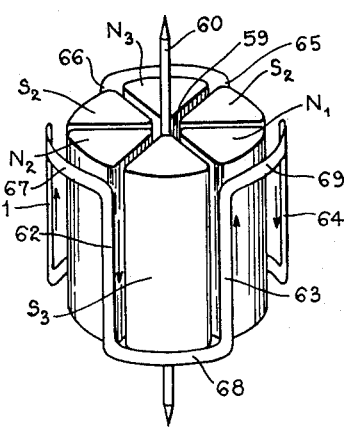

United States Patent Office 3,118,076
Patented Jan. 14, 1964

3,118,076
MAGNETO-ELECTRIC SYSTEM TO MAINTAIN THE OSCILLATIONS OF A BALANCE WHEEL IN A CLOCK-WORK
Serge Held, 29 Rue Bleue, Paris, France
Filed Mar. 5, 1958, Ser. No. 719,336
Claims priority, application France Mar. 6, 1957
19 Claims. (Cl. 310—39)

The present invention relates to an oscillating motor for portable electric watches of the type including a small battery housed in the watch-case and used to directly maintain, by propulsive impulses, the oscillations of a balance-wheel acting as a governor and a counter of impulses. The electrical energy of the battery is converted into mechanical power by means of a small electro-magnetic motor, the stator of which is constituted by permanent magnets and the rotor, forming the balance-wheel, is constituted by flat coils moving in the fields of these multipolar magnets having opened or closed magnetic circuits, the oscillations of the balance-wheel associated with a spiral spring being sustained by electrical impulses generated by the closing of a short contact at the passing through the balance position twice for each period, the contact being made between a conducting stud supported by the balance-wheel and a strip, either flexible or rigid and swivelling, fixed upon the plate and following the movable contact over a given angle, then returning to its position of rest on the axis of no torsion of the spiral spring, said axis being also the axis upon which the reversal of the torque takes place, the direction of the current ramining unchanged.

Motors of this type are already known which include, as illustrated in FIGURE 1, a balance-wheel constituted for instance by a disk make of an insulating plastic material, oscillating round an axis 2 and in which is embedded a winding made of two flat and roughly triangular coils 3, 3' movable in a magnetic field parallel to the axis 2 which is formed by six alternated pole pieces $$S_1N_1—S_2N_2—S_3N_3$$

In the position at rest or static balance in which the spiral spring brings back the equilibrium wheel, the coils 3, 3' are in front of two pole pieces, $N_1S_1$, and the direction of the current sent in these coils by the contact controlled by the balance-wheel is such that flux generated by the coils is opposed to the flux of the pole pieces $N_1S_1$. Under these conditions, the position at rest illustrated in FIGURE 1 is a position of unstable equilibrium, that is to say that, the balance-wheel being at rest, if the current is sent in the windings, the electromagnetic forces acting upon the coils 3, 3', are balanced but, as soon as the balance-wheel is slightly moved from this position, it is submitted to a torque directed in the direction of the deviation. When the balance-wheel oscillates in the direction of the arrow $f_1$, the attraction of the poles is added to the repulsion generated by the poles $N_1S_1$ whereas, for the oscillation in the direction $f_2$, the attraction of the poles $N_3S_3$ is added to the repulsion of the poles $N_1S_1$. One knows nevertheless that, with a view of the isochronism of the oscillations of the balance-wheel, the angle of rotation of the balance-wheel along which the driving impulse is exerted must not exceed, at each alternation, a value of 45° to 50°. One sees that, in this device, at least one third of the total mass of the magnets remains unutilised, so that the "volumic" efficiency—that is to say the duty factor of the volume of the magnets is small.

One object of the invention consists in electromagnetic arrangements allowing the highest induction to be obtained in all the region swept by the conductors, a high ratio between the active length of the conductors and connections which do not interfere with the driving torque and a large winning of the volumic driving efficiency.

Another object of the invention is to provide means to obtain the highest efficiency from the total flux generated by the magnets, that is to say the simultaneous use of all the polar areas, particularly all the circular multipolar magnetic area parallel to the plane of the balance-wheel without any pole or part of pole being "dead" or ineffective during the driving impulses, for all the applications of a micro-motor in which the reduction of the bulk and of the factors of consumption and losses of energy is of primary importance.

Still another object of the invention is to provide a number of cooperating windings and magnetic circuits and improvements relating to the magnetic elements with a view to obtain electric fluxes in the desired direction concentrated in the useful space, with the minimum of unwanted leakage.

According to the invention, the above mentioned results are obtained owing to the fact that the winding of the balance-wheel includes an even number, from 4 to 8, of rectilinear bundles of conductors, evenly spaced on the circumference of the balance-wheel and interconnected so that currents of opposed directions flow in the successive bundles and that the inductor includes magnets of alternated polarities, in the shape of circular sectors, disposed concentrically to the axis of oscillation of the balance-wheel and separated by narrow intervals, the number of pole pieces being the same as the number of bundles of conductors, the direction of the magnetic field generated by these pole pieces being normal to the bundles of conductors, one of these elements, the bundles of conductors or the direction of the magnetic field being radial and the other parallel to the axis of oscillation, the spiral return spring being arranged in such a manner that in the position of rest of the balance wheel, the said radial bundles of conductors are in front of the intervals separating the magnets.

According to a first form of embodiment, the winding of the balance-wheel is formed by radial conductors disposed in a plane normal to the axis of oscillation and cooperating with magnetized pole pieces in a parallel direction to this axis. According to another form of embodiment, the pole pieces are radially magnetized and the bundles of conductors are disposed along the generatrices of a cylindrical surface surrounding these pole pieces.

By way of example, several forms of embodiment of the invention are described hereafter and illustrated in the annexed drawing.

FIGURE 1, above described, illustrates diagrammatically the known principle of the device according to the invention.

Figure 4:
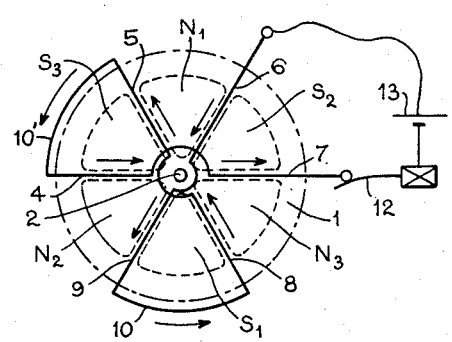
Figure 5:
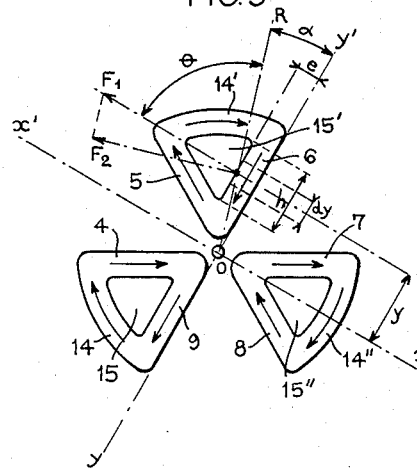
Figure 6:
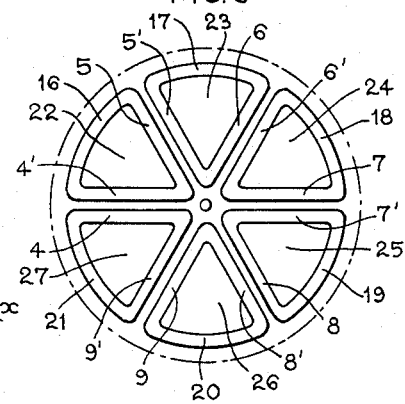

FIGURES 4, 5, 6, relate to various forms of connection of winding with six radial bundles.

FIGURE 7 is a front view of the hexapolar magnetic stator.

FIGURE 8 is an axial section of the device according to the invention.

FIGURE 9 illustrates in a plane view a balance-wheel including eight radial bundles of conductors, connected to form eight coils having the shape of circular sectors with an angle of 45°.

FIGURE 10 shows schematically a perspective view of a form of embodiment in which the bundles of conductors are disposed along the generators of a cylinder surrounding the magnets.

FIGURE 11 is a perspective view, partly broken away, of a similar form of embodiment but showing another mode of interconnection for the bundles of conductors.

FIGURE 12 is an axial vertical section.

Figure 1:
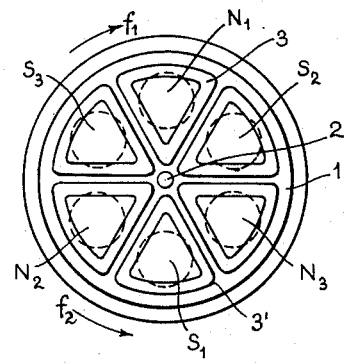
Figure 2:
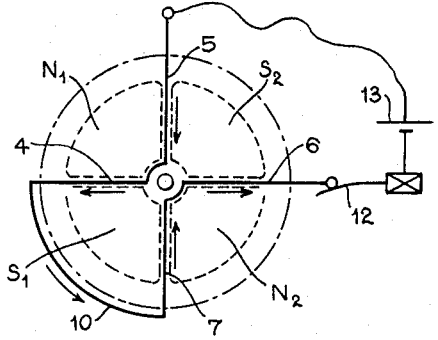
FIGURE 2 illustrates schematically the arrangement of a balance-wheel with four bundles of radial conductors with a hexapolar magnetic stator.

According to the schematic illustration of FIGURE 2, the balance-wheel includes a winding formed by four bundles of radial conductors, 4, 5, 6, 7 offset 90°, and an inductor constituted by four magnets, in the shape of sectors $N_1S_1$, $N_2S_2$, the directions of the currents in the bundles which are fed by a source 13, through the flexible contact 12, controlled by the balance-wheel and are interconnected in series by a connection 10, being selected as above explained.

Figure 3:
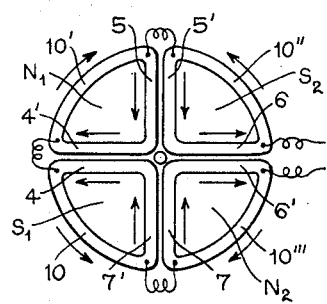
FIGURE 3 shows another form of a possible connection between the bundles.

According to FIGURE 3, each of the radial bundles is bisected in 4, 4'—5, 5'—6, 6'—7, 7', the bundles 4'—5, 5'—6, 6'—7, 7'—4, being respectively connected two by two by the connections in arcs 10, 10', 10", 10''' to form four coils closed in the shape of sectors and able to be interconnected in series.

FIGURE 4 shows schematically the winding of the oscillating element of the motor which secures the motion of the clockwork, consisting, according to the invention, of six bundles or sheets of radial conductors, 4, 5, 6, 7, 8, 9, arranged at angles of 60°, the direction of the currents being on the circumference reciprocally inverted in succession as shown by the arrow, all the conductors being connected in series by concentric conductors 10, 10' which do not interfere with the driving torque. The assembly is supported by a carrier made of a non magnetic and non metallic matter or is embedded in an insulating matter in the shape of a flat washer 1; this washer is to be non-shrinking, with a low expansion coefficient, and may be moulded, preferably hot moulded. Several plastics may be used for this purpose. This washer, formed by the connected windings and centrally crossed by an axle of oscillation interdependent with a spiral spring 11, (FIGURE 8) forms the balance-wheel of the watch.

The moment of inertia and the elastic torque of the spiral spring are chosen to give the selected period of oscillations. The balance-wheel is pivoted above, but very close to, the magnetic stator formed by six magnets $N_1S_1$, $N_2S_2$, $N_3S_3$, assembled as shown in FIGURE 7, to be described later on. The polar surfaces are, in a same plane, paralled to the surface of the balance-wheel 1 and the poles, regularly alternated along the circumference, are jointed or separated by small radial air-gaps; the bundles cover the polar lines of separation just as the contact 12, fed by the source 13 is closed, at the passing of the balance-wheel through the position of static equilibrium (no torsion for the spiral). When the direction of flow of the current above defined is adopted, one sees easily that, if the balance-wheel is moved from this position in either direction, all the bundles tend to move spontaneously in the direction of the motion, supplying positive work along an angular displacement of 60° utmost, corresponding to the passing from a polar separation line or neutral line up to the next polar separation line, from which the direction of the work changes, that is to say that a driving torque should be necessary to move the balance-wheel. The contact must consequently be opened before the arrival in this limiting position and preferably shortly after the defined position of start, as the torque is null when the bundles are exactly in front of the polar separation lines. As a rule, when the amount of rotation of the balance-wheel is 270°, the contact is opened after an angular displacement of 40° to 50° on both sides of the axis where the contact is established. It is to be noted that the six radial bundles having reciprocally inverted directions of flow form three diametrical sheets 4—7, 5—8, 6—9, so that it is possible to close, respectively, each sheet upon itself with peripheral connection conductors, as shown in FIGURE 4, thereby forming three thin mattresses, in the shape of sectors, which are connected in series. Nevertheless, to avoid the crossings of the bundles at the central point, it was deemed better to connect together, as shown in FIGURE 5, the conductors belonging to two neighbouring radial sheets, at the center and at the periphery, by connections 14, 14', 14", thereby forming three coils in a triangular shape 15, 15', 15", with an angular opening of 60° for the mean turn and shifted by 60° from each other.

In the mode of connection illustrated in FIGURE 6, each radial bundle is bisected and, by means of six peripheral circular connections 16, 17, 18, 19, 20, 21, six joined triangular coils 22, 23, 24, 25, 26, 27, having a mean central angle of 60° are formed.

Whatever the number of radial bundles or of complete coils adopted for the rotor, the stator includes an hexapolar magnetic distribution to obtain for a flat watch with a spiral balance-wheel the utmost efficiency as far as torque, efficiency and consumption are concerned.

The making of a small block, forming a multipolar magnet with a diameter varying, according to the size of the watch, from 10 mm. to 25 mm. and a thickness ranging from 3 mm. to 5 mm.—these figures corresponding approxiamtely to the size of the cases of a watch or a small clock—raises magnetization difficulties in the practice, as the strongly coercive materials used must be subjected to intense fields obtained with magnets having a large number of ampere-turns, the poles of which are very close to each other; in addition, it is desirable, to obtain well defined magnetization zones with equal areas, to obtain, simultaneously and in a single operation, the multipoles on the magnet and this is very difficult when the size of the block is very small.

According to the invention, the problem is solved in the best possible way by assembling small magnet-blocks, having a prismatic, trapezoidal or pyramidal shape, that is to say that each block offers four plane faces, the elemental blocks being separately magnetized to form a bipolar magnet, thus allowing a magnetization up to saturation with an outer bipolar magnetic field, very easy to obtain; the small magnets are afterwards juxtaposed to form a multipolar mosaic, constituting a cylindrical magnet-block having a small height and six poles. The polar axes are parallel to the axis of pivoting of the balance-wheel and the radial conductors of the windings meet at a right angle the lines of force. The faces (parallel to the polar axes) are joined and consequently converge towards the center. At the periphery, the faces are preferably rounded but can be straight: the assembly forms a cylindrical or pentagonal block, that is to say a hexagon or a pentagon surrounding the circle described by the balance-wheel.

In FIGURE 7, the magnets 28, 29, 30, 31, 32, 33, are maintained and partitioned, with a small air-gap of about one millimeter by a non-magnetic star 34, and after having been introduced in the cells, are held by a very thin binding 35. The general structure is cell-like or honeycomb. It is foreseen to make the star 34 with an alloy having a Curie point, that is to say an alloy in which the magnetic permeability decreases when the temperature is raised to compensate the increase of the ohmic resistance of the windings with the increase of the temperature as it should tend to reduce slightly the amplitude. It could be possible to magnetize transversely a single cylindrical block to form multiple poles, but tests have shown that a stronger magnetization and a better holding were obtained by proceeding as above explained with a juxtaposition of fragmentary and separately magnetized magnets. In practice, a group of assembled prisms are subjected to an intense bi-polar field and are afterwards disposed to form a polar mosaic, according to the desired distribution. This is done easily and economically by turning three magnets face to face.

It is possible to keep in a multipolar block, as shown in FIGURE 7, a slot 36 free up to the center, thus allowing the axle 2 to be introduced sideways and provided with two footsteps 37, 37' (FIGURE 8) fixed upon the plate;

this is again an advantage of this mode of dividing and assembling small magnets.

When the magnets are made of a very coercive material they can be joined side by side without an air-gap as the lines of force are substantially perpendicular and parallel in all the region in which the windings move, that is to say up to 3 mm. at least from the surface. The oblique leakage lines, from pole to pole correspond to positions which are not used at the moment of the contact, so that the best conditions of use are obtained.

The magnets used in the flat prismatic shape with a thickness of 2 to 5 mm. at the utmost, are made, preferably to metallic materials, with magnetic ceramics or ferrites which have the advantage, for the present use, of being lighter and electrically insulating.

To shorten the path of the lines of force in the air and thereby to increase the induction in the region in which move the conductors, it has been foreseen to close the magnetic circuits by placing upon the magnet-blocks, as shown in FIG. 8, a thin armature of soft iron, in the shape of a disk, delimiting an air-gap in which moves the flat rotor 1, said armature of soft iron being magnetically connected in 40 with a plate of soft iron 39 upon which rest the opposed inactive faces of the magnets. The advantage of this arrangement is that the path of the lines of force is shortened by giving them in the air-gap a better parallelism, thus improving the torque and in same time forming a magnetic screen towards the adjoining pieces of clockwork. This screen could, if necessary, be strengthened by a cylindrical binding having evidently a diameter larger than the diameter of the hexapolar surface, to avoid important magnetic leakages.

As above indicated, the new notion of "volumic" efficiency, and the means to improve this efficiency characterize principally the invention. The coefficient of efficiency will be at the utmost if, according to FIGURES 2 to 4 inc., a winding is constituted with six sheets or diametral bundles which register with the intervals separating the corresponding magnets at the beginning and at the end of the driving stroke. This last position is never reached as, for reasons of isochronism, it is known from experience that the balance-wheel must be entirely freed from any driving on passive force after a run of 40° to 45° on both sides of the equilibrium position.

A stator with eight poles and eight radial bundles could also be constituted, each pole forming a sector with an opening of 45°, this being the extreme limit of the possibilities. This arrangement is illustrated in FIGURE 9: eight radial bisected bundles, 41, 42, 43, 44, 45, 46, 47, 48 are interconnected to form eight coils 51, 52, 53, 54, 55, 56, 57, 58. The invention applies more particularly to an hexapolar stator, such as described, with three or preferably six triangular coils or an octapolar stator with four or eight triangular coils.

Attention must be drawn to the fact that, as shown in FIGURE 4, the six radial bundles should be used by connecting the conductors 4—5, to form a coil, and in the same way, the conductors 6—7 and the conductors 8—9. The sides 4—5 closed by 10′, framing in closed circuit the south pole $S_3$, form with the conductors 6 and 9 two non closed windings framing the two consecutive north poles $N_1$ and $N_2$, just as if there were three coils in closed circuit and three other coils in non closed circuit; the actions of these coils are identical as the conductors of peripheral connection do not interfere.

The advantage of an arrangement of six closed coils side by side (FIG. 5) in relation to three closed coils (FIG. 4) appears clearly from the following remarks: let $e$ (FIG. 5) be the width of a triangular winding: assuming that this winding has passed beyond the position of the moment of contact, the two sides subtending an angle of 60° being over the regions under the influence of the magnetic fields and studying particularly the side 6 of the coil 15, 15′, the other side 5 being the seat of identical phenomena, the forces exerted upon each portion $dy$ of the conductor are fairly equal, proportional to the field and to the density and perpendicular to the portion of the conductor which is observed but the moments depend on the distance of each portion $dy$ from the centre $o$, their obliqueness in relation to a radius, and, for the wires parallel to the radius, on the distance from this radius, so that the efficiency is decreasing from the outer conductors to the inner conductors. On the conductor 6, the element $dy$, at a distance $y$ of the axis $o$—$x$ is subjected to a moment $m = Hidy$, H being the density of the magnetic field and $i$ the strength of the current in the bundle 6. By integrating from $o$ to R (radius), it can be seen that the resulting moment is proportional to the square of the radius R, like the counter electromotive force.

The rounded parts are specially unfavourable in the peripheral region, particularly for the short turns. One sees that, for the inner turn, the useful length is approximately $h$ and the integration of the moments must be made on a length $h$ smaller than R. In addition, if one considers an element of the conductor at the same distance $y$ of the axis $x'$, $x$, this element is subjected to a force $F_1$, the projection of which on an axis perpendicular to the radius OR gives the moment in relation to the axis of oscillation O. ($F_2 = F_1 \sin \theta$), $\theta$ being equal to nought for all the rounded parts, the tangent of which are perpendicular to the radii. As a conclusion, the width $e$ of the thin bundles must be comparatively small as the parallel conductors forming said bundles are to be directed towards the centre of the described circle.

The thickness of the thin mattresses is limited by the decrease of the magnetic field from the poles, with an open magnetic circuit and by the air-gap, with a closed magnetic circuit. The conductors must thereby be arranged on all the circular surface and one must use six coils which, other things being equal, permit the smallest spreading of the conductors on both sides of the axes passing through the centre of oscillation. Evidently, if the coils are joined (for the same number of conductors), the width of each sheet of a coil, on both sides of $o$—$b$ shall be $e$. The width of radial bundle can be equal to the interpolar air-gap 4 (FIGURE 5) and in this case, the driving torques are generated nearly directly after the moment of the contact. If the outer profile is located inside the surface of a magnet, the driving torque is delayed and there is a slight wastage of current until the passing over the interpolar axes. If the profile extends beyond the corresponding magnet, one of the sheets is subjected to a braking torque before passing over the neutral line and good conditions are fulfilled when the outer turn matches with a polar triangle, including the two polar gaps, that is to say borders the sides of the two magnets neighbouring with this bordered magnet, the inner turns encroaching upon the central pole. The more or less large opening of the sides of the windings allows nevertheless, when the curve of the electromotive force is known, to modify to a certain extent the position of the maximum of the driving torque on the abscissa of the time of contact.

As above explained, the above described arrangement, illustrated in FIGURES 1 to 9 can be inverted by giving to the magnets, juxtaposed in the shape of sectors, a radially directed magnetization, that is to say a magnetization perpendicular to the axis of oscillation and using a balance-wheel in the shape of a hollow cylinder surrounding these magnets and bearing bundles of rectilinear conductors disposed along generatrices of this cylinder in a parallel direction to the axis of oscillation. This embodiment is of great interest as the entire length of the rectilinear conductors is used while the length of the connection conductors is reduced to a minimum. The embodiment can be applied when the device must not necessarily be very flat, for all the portable electrical watches other than the wrist watches, for the small clocks, carriage clocks et cetera.

FIGURE 10 illustrates diagrammatically this arrangement in which six polar pieces $N_1$—$S_1$, $N_2$—$S_2$, $N_3$—$S_3$, in the shape of radially magnetized sectors are placed side by side, as in the preceding cases, with a central aperture for the passing through of the axis 60: the balance-wheel, bearing six bundles of parallel, uniformly alloted conductors, 61, 62, 63, 64, 65, 66, is fixed upon the axis 60; the bundles of conductors are connected in series, alternately at their upper and lower ends by connections in the shape of arcs 67, 68, 69, . . . so that the directions of the currents are contrary in the consecutive bundles of conductors.

According to FIGURES 11 and 12, the conductors, 61—66, are bisected in 61—61', 62—62', 63—63', 64—64', 65—65', 66—66', connected two by two to form closed coils, the upper and lower sides of which are constituted by connections in the shape of arcs, 70—70', 71—71', et cetera. These coils are embedded in the cylindrical part of a bell made of a plastic material 72', supported by the axis 60 which is pivoted in 73—73' and provided with a spiral spring 74. As in the preceding arrangements, the balance-wheel 72 bears a contact piece 75 actuating a flexible blade 76 connected to the source 77. The fixed magnets $N_1S_1$—$N_2S_2$—$N_3S_3$ are fixed upon a small non magnetic plate 78 and the assembly is mounted upon a plate of soft iron 79, bearing a cylinder 80, also of soft iron which surrounds the balance-wheel 72 and through which the circuit of the radial magnetic flux of the fixed permanent magnets is closed.

What I claim is:

1. Electro-magnetic device for maintaining the oscillations of a circular balance-wheel in a clockwork, comprising a vertical axis carrying the balance-wheel, a spiral spring to return said balance-wheel to a position of static equilibrium, a winding formed by an even number, comprised between four and eight, of bundles of rectilinear conductors uniformly distributed on said balance wheel, permanent magnets of alternating polarities having the shape of circular sectors arranged side by side concentrically to the axis of the balance wheel and separated from one another by narrow intervals, the number of said magnets being equal to the number of said bundles, the direction of the magnetic flux generated by said magnets being perpendicular to the direction of the bundles of conductors, one of said directions being radial and perpendicular to the axis of the balance wheel, the other being vertical and parallel to said axis, a current supply, contact means controlled by the oscillations of the balance wheel to send current impulses in the winding at the passing of the balance wheel through its position of static equilibrium, means to interconnect the radial bundles of conductors whereby the said current impulses flowing through two successive bundles are of opposite directions respectively, the return spiral spring being arranged in such a manner that in the position of static equilibrium of the balance wheel, the radial bundles forming the winding are in front of the intervals separating the magnets and the direction of current in the coils being determined to generate in the said position of equilibrium by each coil a magnetic flux having a direction opposite to that of the flux generated by the magnet coinciding with said coil in the said position.

2. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by an even number of bundles of conductors, radially disposed and regularly allotted in said disk to form together equal angles and by connections to interconnect said bundles, a contact controlled by the oscillations of the balance-wheel to feed said winding, said contact being closed at the moment when the balance-wheel passes through its position of static equilibrium fixed by the spiral return spring and the connections being such that the successive radial bundles are respectively crossed by currents of contrary directions, an assembly of fixed permanent magnets of alternating polarities having plane faces parallel to the disk forming the balance-wheel, the number of said magnets being the same as the number of said radial bundles, said magnets being in the shape of a sector, the angle of which is equal to the angle between two successive bundles, the successive magnets of contrary signs being separated from each other by narrow radial intervals and the direction of current in the coils being determined to generate in the said position of equilibrium by each coil a magnetic flux having a direction opposite to that of the flux generated by the magnet coinciding with said coil in the said position.

3. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by six radial bundles of conductors disposed at 60° to each other and by connections to interconnect said bundles, a contact controlled by the oscillations of the balance-wheel to feed said winding, said contact being closed at the moment when the balance-wheel passes through its position of static equilibrium determined by the spiral return spring and the connections being such that the successive radial bundles are respectively crossed by currents of contrary directions, an assembly of fixed permanent six magnets of alternated polarities having plane faces parallel to the disk forming the balance-wheel, said magnets being in the shape of sectors of 60°, the successive polar pieces of contrary signs being separated from each other by narrow radial intervals and the direction of current in the coils being determined to generate in the said position of equilibrium by each coil a magnetic flux having a direction opposite to that of the flux generated by the magnet coinciding with said coil in the said position.

4. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by eight radial bundles of conductors disposed at 45° to each other and by connections to interconnect said bundles, a contact controlled by the oscillations of the balance-wheel to feed said winding, said contact being closed at the moment when the balance-wheel passes through its position of static equilibrium determined by the spiral return spring and the connections being such that the successive radial bundles are respectively crossed by currents of contrary directions, an assembly of eight fixed permanent magnets of alternated polarities having plane faces parallel to the disk forming the balance wheel said magnets being in the shape of sectors of 45°, the successive magnets of contrary signs being separated from each other by narrow radial intervals and the direction of current in the coils being determined to generate in the said position of equilibrium by each coil a magnetic flux having a direction opposite to that of the flux generated by the magnet coinciding with said coil in the said position.

5. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by an even number of bundles of conductors, radially disposed and regularly allotted in said disk to form together equal angles and by connections to interconnect said bundles, a contact controlled by the oscillations of the balance-wheel to feed said winding, said contact being closed at the moment when the balance-wheel passes through its position of static equilibrium determined by the spiral return spring and the connections being such that the successive radial bundles are respectively crossed by currents of contrary directions, an assembly of fixed permanent magnets of alternated polarities having plane faces parallel to the disk forming the balance-wheel, the number of said magnets being the same as the number of said radial bundles, said magnets being in the shape of a sector, the angle of which is equal to the angle between two successive bundles, the successive magnets of opposite polarities being separated from each other by narrow radial intervals, the return spiral spring being arranged so that, in the position of static equilibrium of the balance-wheel, the radial bundles of conductors are in front of the intervals separating the magnets and the direction of current in the coils being determined to generate in the said position of equilibrium by each coil a magnetic flux having a direction opposite to that of the flux generated by the magnet coinciding with said coil in the said position.

6. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by an even number of bundles of conductors, radially disposed and regularly allotted in said disk to form together equal angles and by connections to interconnect said bundles, a contact controlled by the oscillations of the balance-wheel to feed said winding, said contact being closed at the moment when the balance-wheel passes through its position of static equilibrium determined by the spiral return spring and the connections being such that the successive radial bundles are respectively crossed by currents of contrary directions, an assembly of fixed permanent magnets of alternated polarities having plane faces parallel to the disk forming the balance-wheel, the number of said magnets being the same as the number of said radial bundles, said magnets being in the shape of a sector, the angle of which is equal to the angle between two successive bundles, the successive magnets of opposite polarities being separated from each other by narrow radial intervals, the feeding contact of the winding of the balance-wheel being arranged to be kept in closed position during an angle of rotation of the balance-wheel, starting from its position of static equilibrium fairly equal to the angle limited by two successive radial bundles.

7. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by at least three diametrical bundles of conductors, along three regularly spaced diameters and by circular shaped connections connecting in series these three bundles, a contact controlled by the oscillations of the balance-wheel to feed said winding, said contact being closed at the moment when the balance-wheel passes through its position of static equilibrium determined by the spiral return spring, an assembly of fixed permanent magnets of alternated polarities having plane faces parallel to the disk forming the balance-wheel, the number of said magnets being equal to the number of the radial bundles, said magnets being in the shape of a sector the angle of which is equal to the angle between two successive bundles, the successive magnets of opposite polarities being separated from each other by narrow radial intervals.

8. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by an even number of radial bundles of conductors regularly allotted, the successive bundles being directly connected in pairs at their inner ends and their outer ends by circular connections to form closed sector shaped coils, a contact controlled by the oscillations of the balance-wheel to feed said winding, said contact being closed at the moment when the balance-wheel passes through its position of static equilibrium determined by the spiral return spring and the connections being such that the successive radial bundles are respectively crossed by currents of opposite directions, an assembly of fixed permanent magnets of alternated polarities having plane faces parallel to the disk forming the balance-wheel, the number of said magnets being the same as the number of said radial bundles, said magnets being in the shape of a sector, the angle of which is equal to the angle between two successive bundles, the successive magnets of contrary signs being separated from each other by narrow radial intervals.

9. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by an even number of bundles of conductors, radially disposed and regularly allotted in said disk to form together equal angles and by connections to interconnect said bundles, a contact controlled by the oscillations of the balance-wheel to feed said winding, said contact being closed at the moment when the balance-wheel passes through its position of static equilibrium determined by the spiral return spring and the connections being such that the successive radial bundles are respectively crossed by currents of opposite directions, an assembly of fixed permanent magnets of alternated polarities having plane faces parallel to the disk forming the balance-wheel, the number of said magnets being the same as the number of said radial bundles, said magnets being in the shape of a sector, the angle of which is equal to the angle between two successive bundles, the successive magnets of opposite polarities being separated from each other by narrow radial intervals, a thin disk of soft iron upon which the magnets are fixed by their faces opposed to the faces adjoining the balance-wheel, a second thin disk of soft iron disposed on the other side of the balance-wheel to form an air-gap in which said balance-wheel oscillates and a magnetic connection provided between the two disks.

10. An electromagnetic device according to claim 1, in which the juxtaposed sector shaped magnets have a radial magnetization to offer on their outer cylindrical parts alternately North and South polarities, whereas the bundles of rectilinear conductors of the balance-wheel are arranged along the regularly spaced generatrices of a cylindrical surface concentrically surrounding the assembly of magnets.

11. An electromagnetic device according to claim 1, in which the juxtaposed sector shaped magnets have a radial magnetization to offer on their outer cylindrical parts alternately North and South polarities, whereas the balance-wheel is constituted by a bell-shaped piece with a cylindrical part surrounding the assembly of magnets, rectilinear, regularly spaced bundles of conductors being mounted upon this cylindrical part of the bell-shaped balance-wheel.

12. An electromagnetic device according to claim 1, in which the juxtaposed sector shaped magnets have a radial magnetization to offer on their outer cylindrical parts alternately North and South polarities, whereas the balance-wheel is constituted by a bell-shaped piece with a cylindrical part surrounding the assembly of magnets, rectilinear, regularly spaced bundles of conductors being mounted upon this cylindrical part of the bell-shaped balance-wheel, connections alternating between the upper and lower ends of said bundles to connect them in series.

13. An electromagnetic device according to claim 1, in which the juxtaposed sector shaped magnets have a radial magnetization to offer on their outer cylindrical parts alternately North and South polarities whereas the balance-wheel is constituted by a bell-shaped piece with a cylindrical part surrounding the assembly of magnets, rectilinear, regularly spaced bundles of conductors being mounted upon this cylindrical part of the bell-shaped balance-wheel, arc shaped connections, provided to interconnect, two by two, the adjoining bundles by their upper and lower ends, to form closed coils, the number of which is the half of the number of the bundles and the poles and means to connect together in series said coils.

14. An electromagnetic device according to claim 1, in which the juxtaposed sector shaped magnets have a radial magnetization to offer on their outer cylindrical parts alternately North and South polarities, whereas the balance-wheel is constituted by a bell-shaped piece with a cylindrical part surrounding the assembly of magnets, rectilinear, regularly spaced bundles of conductors being mounted upon this cylindrical part of the bell-shaped balance-wheel, each of the bundles being bisected in two adjoining half-bundles and the half-bundles of two neighbouring bundles being provided at their upper and lower ends with arc shaped connections to form closed coils, the number of which is equal to the number of the bundles and poles and means provided to connect in series said coils.

15. A device according to claim 1 in which the narrow intervals separating the sector shaped polar pieces are filled up with a non-magnetic material.

16. A device according to claim 1 in which the narrow intervals separating the sector shaped polar pieces are filled up with an alloy of which the magnetic permeability decreases when the temperature rises up.

17. A device according to claim 1 wherein the contact arrangement controlled by the balance wheel comprises an elastic contact strip provided to maintain the contact closed during an amplitude of oscillations of the order of 45° on either side of the position of static equilibrium.

18. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by an even number of bundles of conductors, radially disposed and regularly allotted in said disk to form together equal angles and by connections to interconnect said bundles, a contact controlled by the oscillations of the balance-wheel to feed said winding, said contact being closed at the moment when the balance-wheel passes through its position of static equilibrium fixed by the spiral return spring and the connections being such that the successive radial bundles are respectively crossed by currents of contrary directions, an assembly of fixed permanent magnets including several alternated polar pieces having plane faces parallel to the disk forming the balance-wheel, the number of said polar pieces being the same as the number of said radial bundles, said polar pieces being in the shape of a sector, the angle of which is equal to the angle between two successive bundles, the successive polar pieces of contrary signs being separated from each other by narrow radial intervals, the spiral return spring being arranged so that, in the position of static equilibrium of the balance-wheel the radial bundles of conductors are in front of the intervals separating the polar pieces, the width of the radial bundles of conductors of the balance-wheel being fairly equal to the width of the intervals separating the successive polar pieces and the direction of current in the coils being determined to generate in the said position of equilibrium by each coil a magnetic flux having a direction opposite to that of the flux generated by the magnet coinciding with said coil in the said position.

19. Electromagnetic device for the upkeep of the oscillations of the balance-wheel in a clock-work including a disk made of an insulating material forming a balance-wheel, a central axis supporting this disk and a spiral return spring, a winding embedded in said disk and constituted by an even number of bundles of conductors, radially disposed and regularly allotted in said disk to form together equal angles and by connections to interconnect said bundles, a contact controlled by the oscillations of the balance-wheel to feed said winding, said contact being closed at the moment when the balance-wheel passes through its position of static equilibrium fixed by the spiral return spring and the connections being such that the successive radial bundles are respectively crossed by currents of contrary directions, an assembly of fixed permanent magnets including several alternated polar pieces having plane faces parallel to the disk forming the balance-wheel, the number of said polar pieces being the same as the number of said radial bundles, said polar pieces being in the shape of a sector, the angle of which is equal to the angle between two successive bundles, the successive polar pieces of contrary signs being separated from each other by narrow radial intervals, a thin disk of soft iron upon which the polar pieces are fixed by their faces opposed to the faces adjoining the balance-wheel and the direction of current in the coils being determined to generate in the said position of equilibrium by each coil a magnetic flux having a direction opposite to that of the flux generated by the magnet coinciding with said coil in the said position.

References Cited in the file of this patent

UNITED STATES PATENTS

| | | |
|---|---|---|
| 290,199 | Ball | Dec. 18, 1883 |
| 1,566,693 | Pletscher | Dec. 22, 1925 |
| 2,916,641 | Held | Dec. 8, 1959 |
| 2,943,215 | Pommert | June 28, 1960 |
| 2,976,435 | Van Horn | Mar. 21, 1961 |

FOREIGN PATENTS

| | | |
|---|---|---|
| 1,134,560 | France | Dec. 3, 1956 |